(No Model.) 7 Sheets—Sheet 3.
F. G. LANGE.
MACHINE FOR COMBING WOOL, &c.
No. 410,420. Patented Sept. 3, 1889.
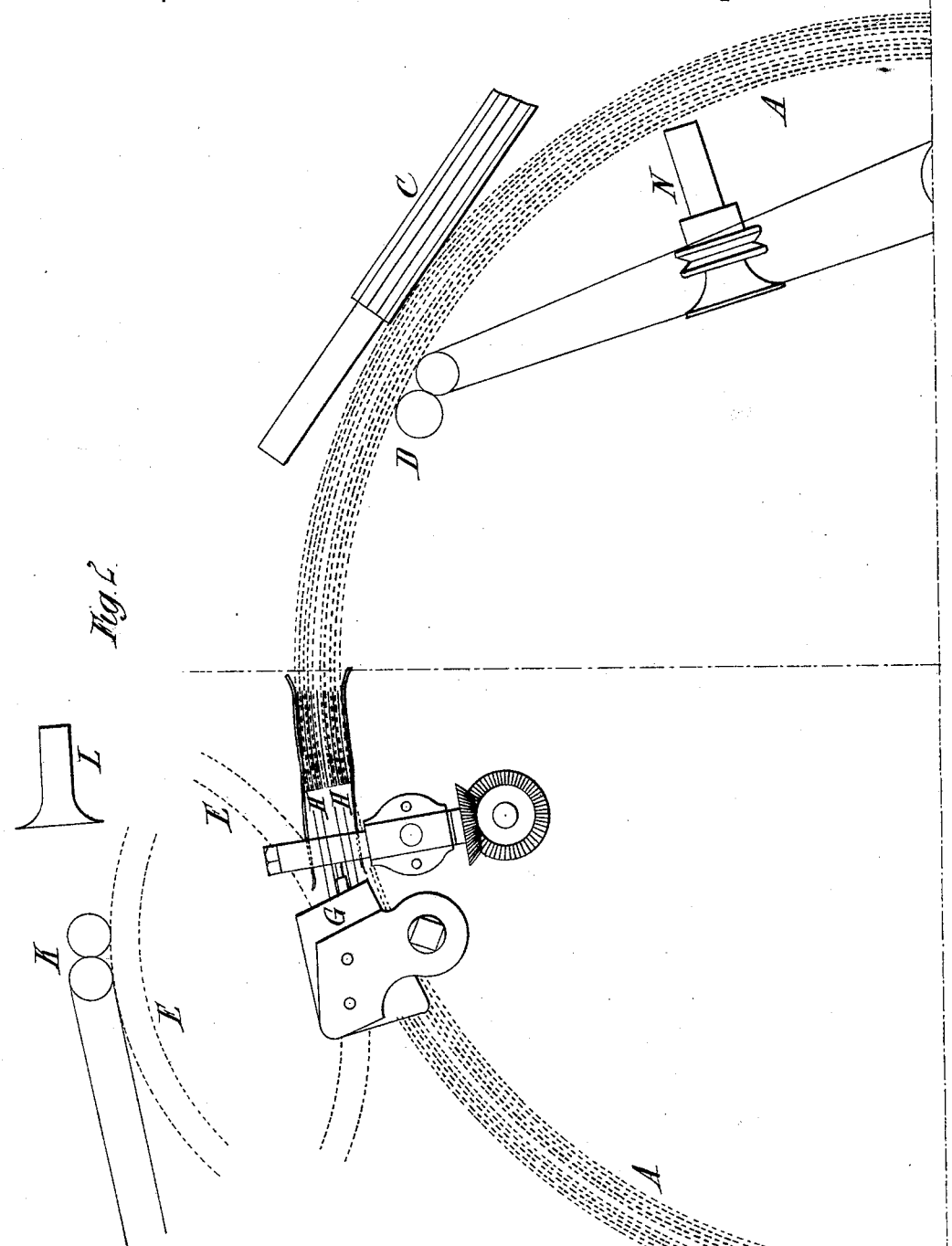
Witnesses,
J. A. Rutherford
Robert Everett.
Inventor,
Frederick G. Lange,
By James L. Norris.
Atty.

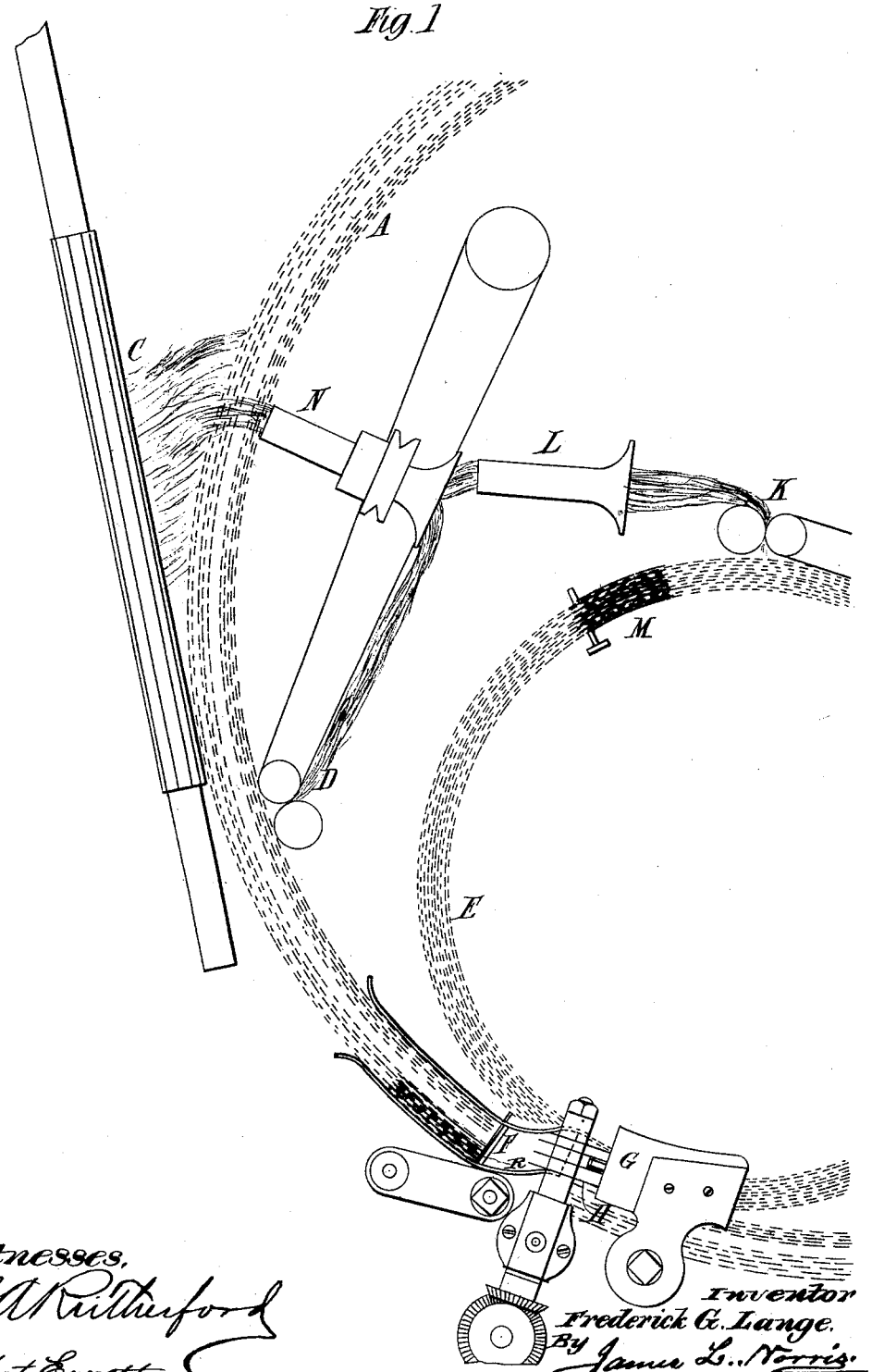

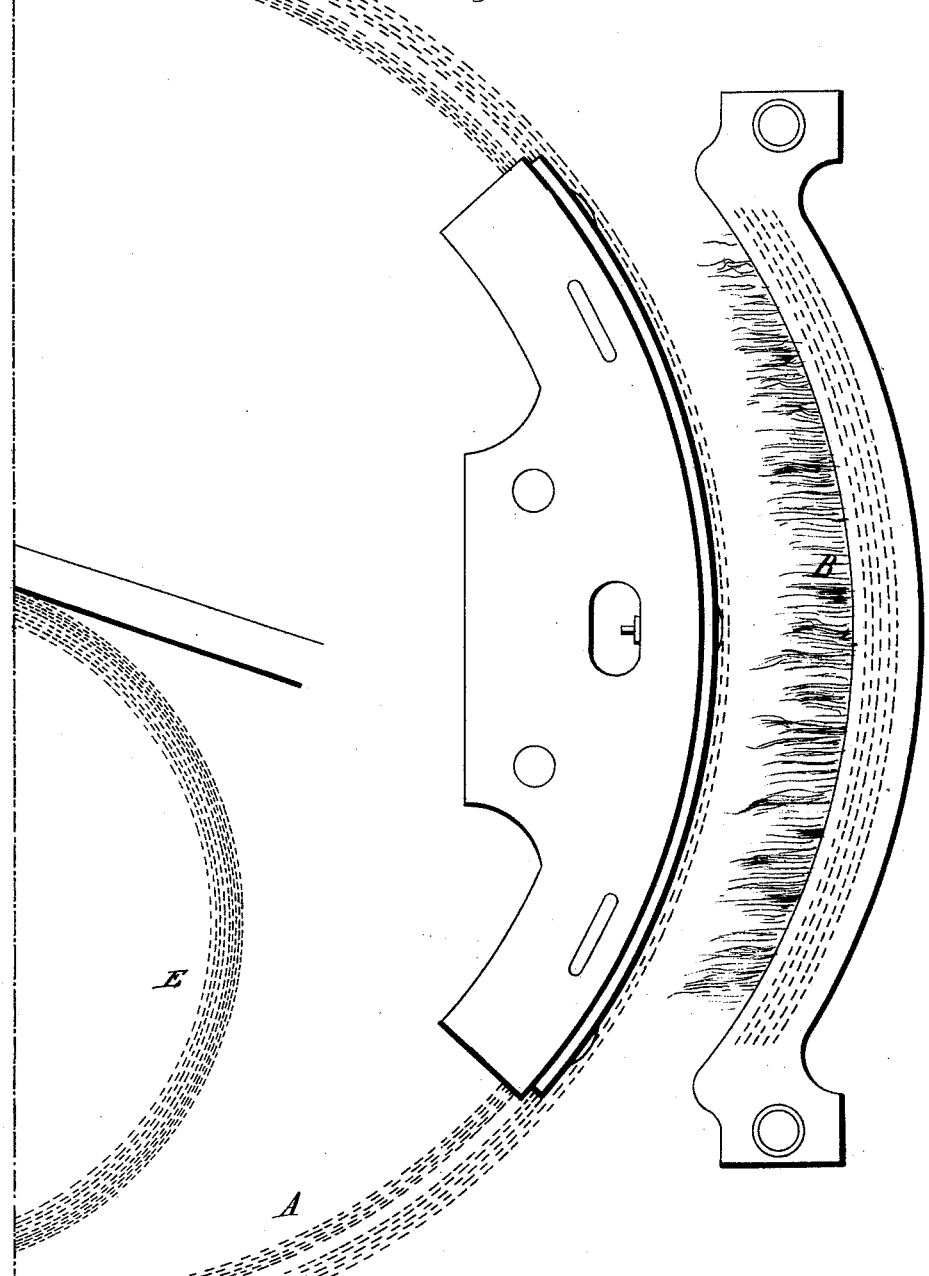

(No Model.) 7 Sheets—Sheet 4.
F. G. LANGE.
MACHINE FOR COMBING WOOL, &c
No. 410,420. Patented Sept. 3, 1889.
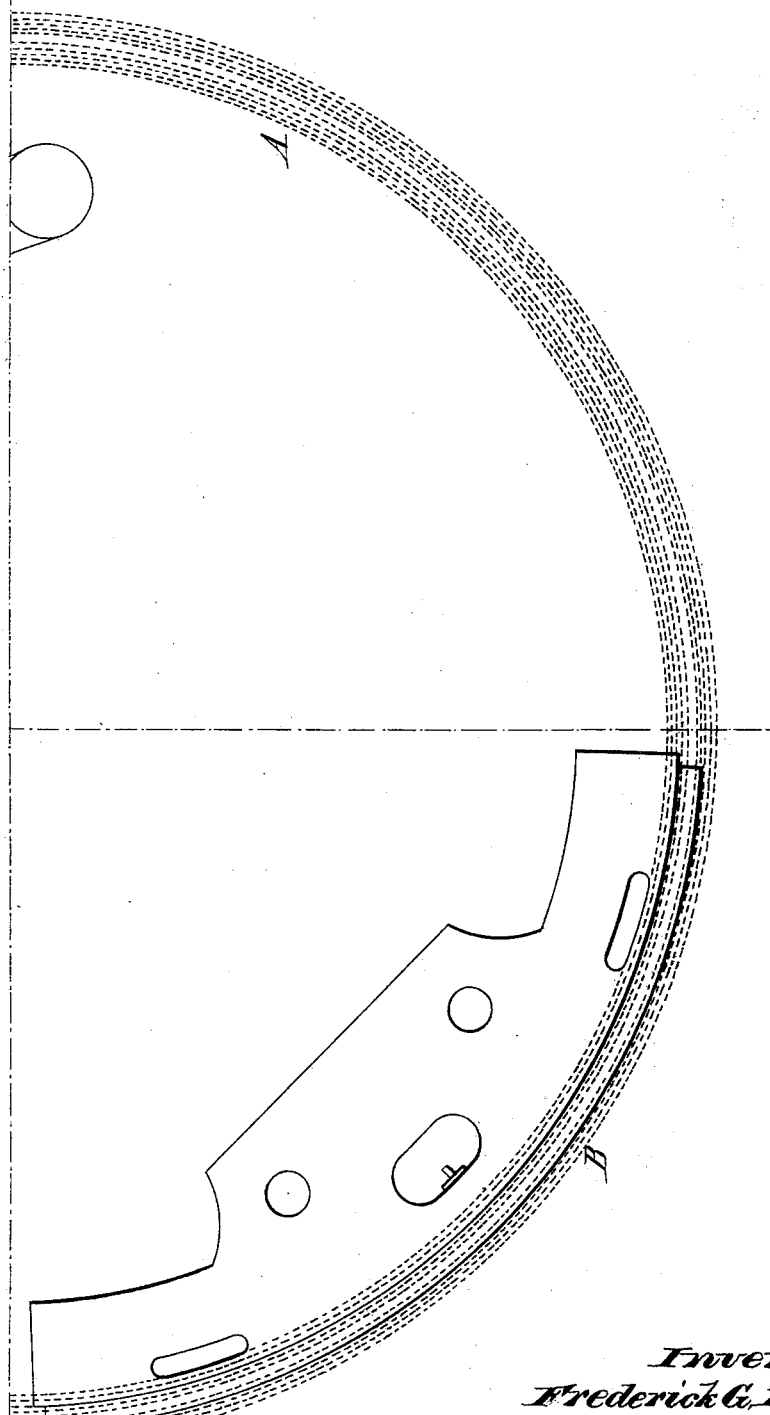
Witnesses,
J. A. Rutherford
Robert Everett
Inventor,
Frederick G. Lange,
By James L. Norris,
Atty

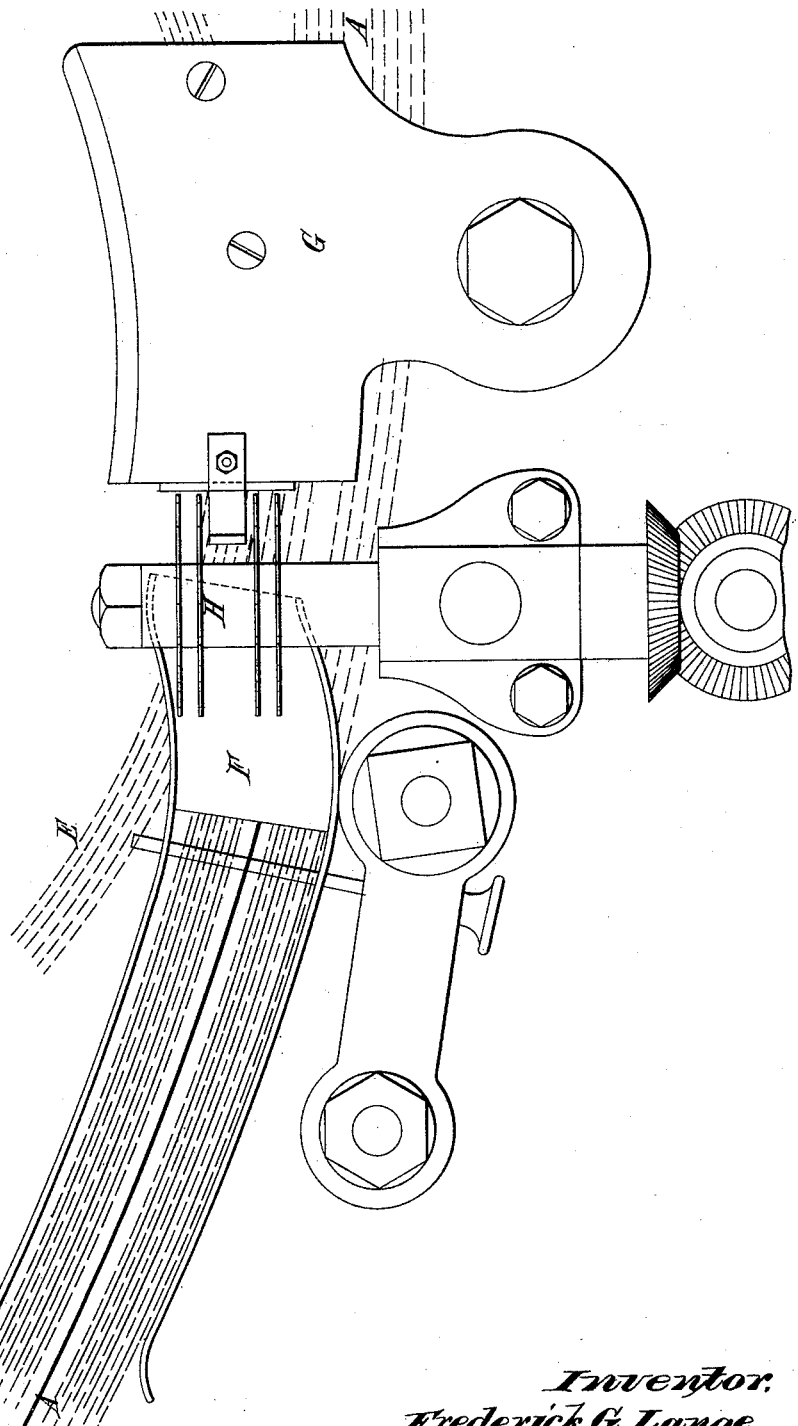

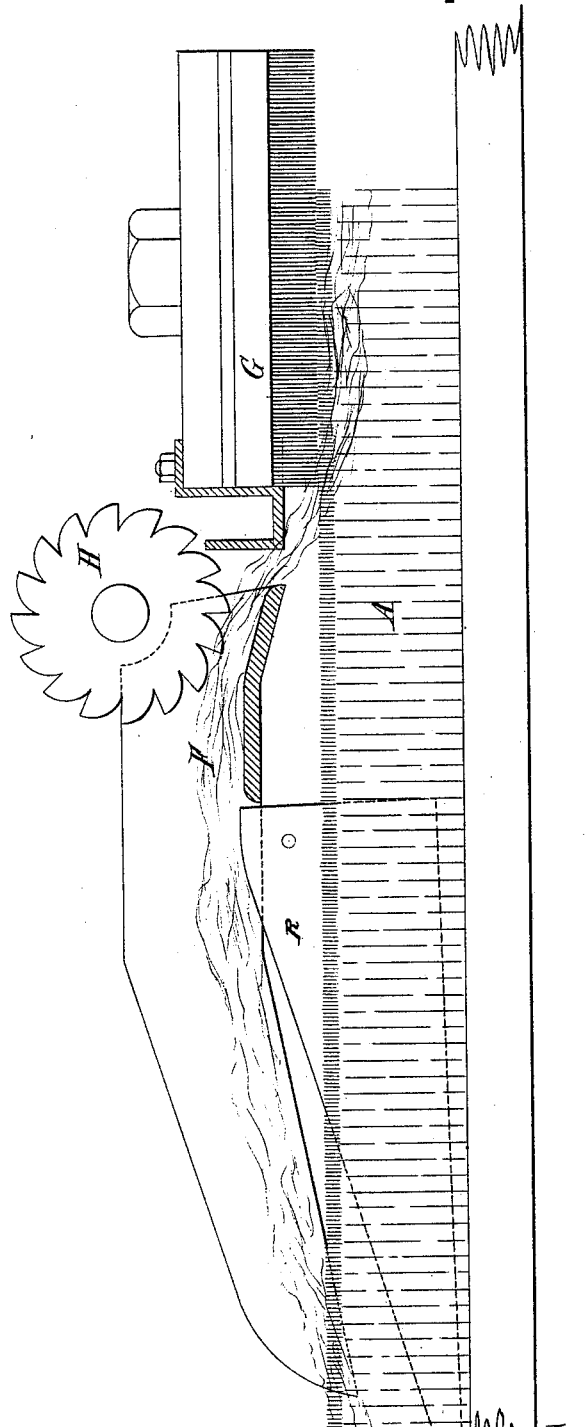

(No Model.)
7 Sheets—Sheet 7.
F. G. LANGE.
MACHINE FOR COMBING WOOL, &c.
No. 410,420. Patented Sept. 3, 1889.
Fig. 5.
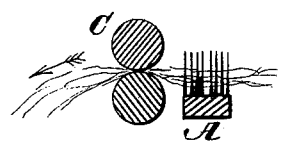
Fig. 6.
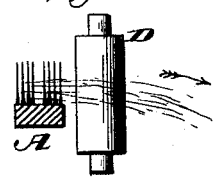
Fig. 7.
Fig. 8.
Fig. 9.
Fig. 10.
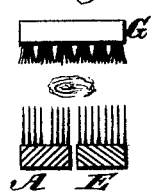
Fig. 11.
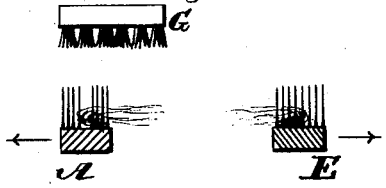
Fig. 12.
Fig. 13.
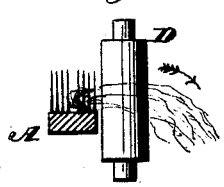
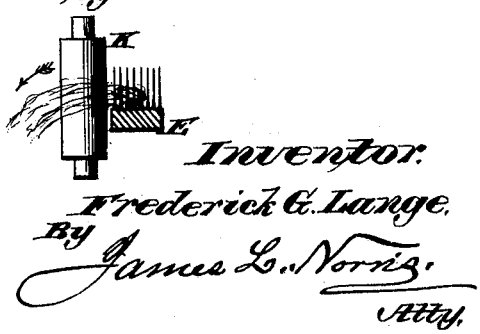
Witnesses.
Robert Everett.
Jo. L. Coombs
Inventor.
Frederick G. Lange,
By James L. Norris.
Atty.

UNITED STATES PATENT OFFICE.

FREDERICK GEORGE LANGE, OF ST. ACHEUL-LES-AMIENS, FRANCE.

MACHINE FOR COMBING WOOL, &c.

SPECIFICATION forming part of Letters Patent No. 410,420, dated September 3, 1889.

Application filed May 3, 1882. Serial No. 60,240. (No model.) Patented in France March 7, 1881, No. 141,552, and in England March 16, 1881, No. 1,136.

*To all whom it may concern:*

Be it known that I, FREDERICK GEORGE LANGE, of St. Acheul-les-Amiens, France, have invented new and useful Improvements in Machines for Combing Wool and other Fibrous Material, (for which I have obtained a patent in Great Britain, No. 1,136, bearing date March 16, A. D. 1881, and a patent in France, No. 141,552, bearing date March 7, 1881,) of which the following is a specification, reference being had to the accompanying drawings.

In that class of machines known to wool-combers as the "Rawson," being substantially the apparatus shown in English Letters Patent No. 996, dated April 20, 1859, and in similarly-operating wool-combing machines, the wool from the feeding-head is deposited in a circular receiving-comb, and the fringe of clean wool projecting from the outside of the comb is drawn off in the form of a sliver by drawing-off rollers, as is well understood. Such machines so worked produce too much noil in an economical point of view.

This invention relates to improvements in connection with wool-combing machinery of this kind, whereby the noils which remain after the first combing operation are themselves combed, an additional yield of long-stapled wool or fiber being thus produced. For this purpose the feeding-head is caused to place the wool so far over the circular receiving-comb that the ends of the sliver project inside the comb, such ends being already in a clean state owing to their having been drawn (during the previous stroke of the machine) through the teeth of the circular comb. A brush is caused to press down on the wool as soon as the feed-head has deposited the ends of the sliver onto the comb, and then the feed-head retiring separates the slivers from the wool in the comb and draws the extreme ends of the slivers so separated through the teeth of the circular comb, thus clearing them, ready for the next stroke of the feed-head. The top or clean wool is usually drawn off from the outside by horizontal rollers. In the arrangement about to be described it is also drawn off from the inside of the circular comb by vertical rollers, these last being placed a little farther round the comb than the horizontal rollers, so that the two pairs of rollers may not pull against each other. The noil remaining in the circular comb now passes on in the comb for a short distance, and instead of being lifted out and treated as noil, which is of small value as compared with the top or clean wool, it is, according to this invention, so treated as to obtain from such noil such further quantity of wool as is fit to produce top or clean wool, and this is done by carefully lifting the noil up out of the circular comb and conducting it in a small trough or guide a small distance sidewise out of its course and then pressing it down partly onto the inside teeth of the main or large circular comb and partly onto the teeth of another smaller or secondary circular comb placed close inside the first one, so that the noil is in fact in both combs at the same time. Then as they separate in their revolutions the noil is separated and part goes forward in the large circular comb and part in the small circular comb, while such fibers as are capable of forming top or clean wool project in a clean combed state from the inside of the large circular comb and from the outside of the small circular comb. The portion carried by the large circular comb passes on in it until the comb receives its supply from the feeding-head, and such portion as is capable of forming top or clean wool is drawn off along with a portion of the fresh wool by the vertical drawing-off rollers inside the large circular comb. The portion carried by the small circular comb has the top or clean wool drawn off from it by another pair of vertical drawing-off rollers placed a little farther round the circle, and such top runs through a tweedler (or revolving tube) and joins the top or clean wool from the other parts of the machine. The noil still remaining after this operation is lifted by noil-knives and dropped into a noil-can, being in fact nothing but actual noil, as all the top or clean wool has been taken out of it.

Figures 1 and 1ᵃ are diagrammatic plan views of a portion of a combing-machine with my invention applied thereto, showing the small comb arranged inside the main comb. Figs. 2 and 2ᵃ are similar views showing, in Fig. 2, the small comb arranged outside the main comb, the former being partly broken away for want of space. Fig. 3 is a view, on an enlarged scale, of the noil-shifting apparatus. Fig. 4 is a vertical longitudinal section of the same. Figs. 5 and 6 show the process of drawing off the "top" from the large receiving-comb. Figs. 7 to 13 show how the wool left from the former process in the large receiving-comb is combed by the large and small circular combs and how the top is subsequently drawn off.

A is a large circular receiving-comb. B is the ordinary feeding apparatus; C the horizontal and D the vertical drawing-off rollers.

E is the small circular comb, which is adjusted to run very close to the inside of the large circular comb, its outside circumference running at the same speed as the inside circumference of the large circular comb.

F is a trough for conducting the noil from the position which it occupies immediately over the large circular comb (at the moment it is lifted out of it) to a position immediately over the point where the outside of the small circular comb comes nearest to the inside of the large circular comb, so that it may be at once deposited partly into one comb and partly into the other, and be pressed down on them by a "dabbing-brush" G, worked rapidly up and down. The sides of the trough are made with a slight bend or curve in them, so as to receive the noil and curve it sidewise, and then again allow of its being passed forward so as to lie in a fair line with the two combs before being pressed down into them. There are a series of small "sun-wheels" H H, arranged inside the trough for the purpose of passing the noil forward without breaking it, as it is important for the purpose of this invention that the noil should not be broken up, but that it should, as far as possible, form a fair unbroken line as it proceeds forward.

On the continued rotation of the two circular combs a portion of the noil remains in each as they separate. A certain portion of top or clean wool projects in a fringe from the inside of the large circular comb and from the outside of the small circular comb. In order to draw off this top or clean wool projecting from the outside of the small circular comb, I place a pair of drawing-off rollers K, with a tweedler L, at a suitable point outside of the periphery of the said small circular comb. A continuous sliver of top or clean wool is drawn off by the drawing-off rollers K. The noil then remaining in the comb, after such second quantity of top or clean wool has been drawn from it, is lifted out by noil lifters or knives M, and passed away into a noil-can in the usual way. The top or clean wool remaining on the inside of the large circular comb is left in it to be drawn off by the drawing-off rollers D, inside the large circular comb, together with the top or clean wool received in the first instance from the feeding-head. The feeding head or apparatus B, carrying a set of pins, combs, and gill-bars advances up to the receiving-comb A, and places the projecting end of the sliver into it, so that when the feeding apparatus retires it combs the fringe projecting from the receiving-comb A, while the latter combs the end of the sliver projecting from the feed or head combs.

It is obvious that it is a clean fringe of wool which is left in the inside of the comb A, as well as on the outside, because this inside fringe is that which was combed by the circular combs in the former stroke. These two fringes have now to be drawn off. (Fig. 5 shows how.) As the circular comb A slowly revolves, it brings the outside fringe to the horizontal drawing-off rollers C, placed outside the comb, and by which a clean sliver of combed wool is drawn from the comb. Farther on, as in Fig. 6, the comb A brings the inside fringe to the vertical drawing-off rollers D, by which another clean sliver of combed wool is drawn from the comb A and run out of the machine through the tweedler N. (See Fig. 1.) The wool remaining in the circular comb A is lifted out in an unbroken state by lifting-knives R, Fig. 3, the unbroken mass being shunted sidewise by the oblique trough F about half its width, and is maintained by the suns H in position to be forced down into the two circular combs A E at their junction by the quick-acting dabbing-brush G.

In Fig. 7 the comb A is shown with the wool that was in it after the previous drawing-off of the top from the inside and outside, and the portion containing the wool is still at a distance from the small circular comb. In Fig. 8 this wool has been lifted out of the comb A in an unbroken state by the lifting-knives R, Figs. 2, 3, and 4, preparatory to being deposited into the combs A and E at their junction. In Fig. 9 the wool has been shunted sidewise about half its width by passing through the oblique trough F, (see Fig. 3,) and is ready to be forced down into the two circular combs A E by the quick dabbing-brush G. Fig. 10 shows it so pressed down by the brush G as to be thoroughly held by the two combs, about half being in each comb. Thus the center of the mass of wool left in the large circular comb A, after the first operation, is now at the exact line of junction of the two circular combs.

In Fig. 11 the brush G has risen, and the combs in their further revolution have separated from each other at the points containing the wool. Each has combed the wool projecting as a fringe from the other, thus leaving one clean fringe of wool on the inside of the large circular comb A, and another on the outside of the small circular comb E, the wool thus being combed by the separation of combs, as before. Of these fringes that which projects inside the large circular comb is allowed to remain in it and to pass round to the feeding-head where the fresh wool is being fed in. It then passes on as part of the main bulk of wool inside the large comb, and is drawn off by the vertical drawing-off rollers D, Fig. 12. The other clean fringe of long wool which is left in the small receiving-comb E is drawn off by a third pair of drawing-off rollers K, Fig. 13, and forms an additional or third sliver of clean wool, which is added to the other two and runs out of the machine through the tweedlers L and N, so as to form one continuous body of clean top.

The noil remaining in the small circular comb E is lifted out by knives or lifters M, Fig. 1. This is all actual noil, and is capable of being used at once for all the ordinary purposes for which noil is adapted, and is rather more valuable than the noil ordinarily obtained, as it has had less strain put on it and is less broken than if it had been subjected to a positive nip in a nipping apparatus. The clean top is also more valuable than usual, because it has not been broken or strained in combing by any nipping apparatus, nor has it been violently treated in any way. It thus remains of its full natural length, or about one-fifth longer than if it had been combed on a machine working with a nip, and therefore it can be spun to a higher number or count.

Thus two additional quantities of top or clean wool are obtained from the noil remaining after top or clean wool has been drawn off from the outside and inside of the large circular comb. The whole of this top or clean wool is run between and united by the horizontal rollers C, and represents a larger percentage of top or clean wool on the original bulk of wool than can be obtained by an ordinary combing-machine, and such wool so treated is not broken, as it would be if manipulated or worked in a wool-combing machine working by means of a positive nipping apparatus, as the wool is not subjected to severe strains and consequent rupture of a portion.

The objection hitherto holding against there being a large number of rows of teeth in the circular receiving-comb—viz., that more noil would thereby be created (although cleaner top could by such an arrangement be produced)—now no longer holds good, as according to this invention all top or clean wool can be effectually drawn off from the central portion of the wool left in the comb as noils, after top or clean wool has been drawn off from the outside and inside of the circular receiving-comb, so that not only is all the top cleaner and better, but, in consequence of there being a large number of rows of teeth in the circular receiving-comb, a larger quantity of uncombed wool may be placed on it at each stroke of the feeding-head.

The smaller comb may be arranged outside the larger comb, as shown in Fig. 2, the action being similar.

Although this invention has hereinbefore been described and shown as applied to a Rawson wool-combing machine, it is obvious that by applying noil-shifting apparatus such as has been described to circular combing-machines that operate in a manner similar to Rawson's machine the like advantages can be secured.

Having thus described my invention, what I claim is—

1. The combination, with the large circular comb A and the small circular comb E, of the horizontal drawing-off rollers C, the vertical drawing-off rollers D K, and the tweedlers L N, substantially as described.

2. The combination of the large circular comb A, the small circular comb E, the oblique trough F, sun-wheels H, knives R, and dabbing-brush G, located at the junction of said combs, the horizontal drawing-off rollers C, the vertical drawing-off rollers D K, the tweedlers L N, and the knives M, substantially as described.

In witness whereof I have hereunto signed my name in the presence of two subscribing witnesses.

Paris, April 18, 1882.

FREDERICK GEORGE LANGE.

Witnesses:
GEORGE WALKER,
DAVID T. S. FULLER,
*Both of 3 Rue Scribe, Paris, France.*